US011516198B2

(12) United States Patent
Igari

(10) Patent No.: US 11,516,198 B2
(45) Date of Patent: Nov. 29, 2022

(54) ELECTRONIC DEVICE MOUNTING DISPLAY, CONTROL METHOD THEREOF AND INFORMATION PROCESSING SYSTEM

(71) Applicant: CANON KABUSHIKI KAISHA, Tokyo (JP)

(72) Inventor: Toshinori Igari, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 16/929,665

(22) Filed: Jul. 15, 2020

(65) Prior Publication Data

US 2021/0029101 A1 Jan. 28, 2021

(30) Foreign Application Priority Data

Jul. 26, 2019 (JP) ............................. JP2019-137854

(51) Int. Cl.

| | |
|---|---|
| ***H04L 9/40*** | (2022.01) |
| ***G06F 3/14*** | (2006.01) |
| ***G06K 7/14*** | (2006.01) |
| ***G06K 19/06*** | (2006.01) |
| *G06F 3/01* | (2006.01) |
| *H04N 1/00* | (2006.01) |

(52) U.S. Cl.

CPC ................ *H04L 63/08* (2013.01); *G06F 3/14* (2013.01); *G06K 7/1417* (2013.01); *G06K 19/06037* (2013.01); *H04N 1/00244* (2013.01); *H04N 1/00411* (2013.01); *H04N 1/00477* (2013.01)

(58) Field of Classification Search

CPC ........... H04N 1/00477; H04N 1/00411; H04N 1/00244; G06K 19/06037; G06K 7/1417; G06F 3/14; H04L 63/08

See application file for complete search history.

(56) References Cited

U.S. PATENT DOCUMENTS

| | | | | |
|---|---|---|---|---|
| 5,101,425 | A * | 3/1992 | Darland | H04Q 3/0087 379/112.01 |
| 6,047,320 | A * | 4/2000 | Tezuka | H04L 41/00 714/21 |
| 6,462,762 | B1 * | 10/2002 | Ku | G06F 3/0481 715/854 |
| 6,732,090 | B2 * | 5/2004 | Shanahan | G06F 16/38 |
| 6,934,749 | B1 * | 8/2005 | Black | H04L 69/18 709/224 |

(Continued)

FOREIGN PATENT DOCUMENTS

| | | |
|---|---|---|
| JP | 2009-140204 | 6/2009 |

*Primary Examiner* — Nicholas Augustine

(74) *Attorney, Agent, or Firm* — Venable LLP

(57) ABSTRACT

There is a technique that displays a QR code in which a URL of an error information site is embedded on a display in a case where an error occurs in a printer or the like and allows an access to the error information site by a mobile terminal capturing the QR code. However, on a condition that the size of the display is small, there is a case where it is not possible to display the QR code in which the URL of the error information site is embedded. In an electronic device mounting a display, an access code indicating first resource specification information for redirect is created and the created access code is displayed on the display. Then, the first resource specification information has a data amount corresponding to an access code of a size than can be displayed on the display.

13 Claims, 14 Drawing Sheets

(56) References Cited

U.S. PATENT DOCUMENTS

| | | | | |
|---|---|---|---|---|
| 6,985,912 | B2 * | 1/2006 | Mullins | G06F 16/9574 |
| 7,028,306 | B2 * | 4/2006 | Boloker | G06F 8/38<br>719/310 |
| 7,117,432 | B1 * | 10/2006 | Shanahan | G06F 16/353<br>715/236 |
| 8,807,434 | B1 * | 8/2014 | Windmueller | G06K 19/06037<br>235/462.15 |
| 2007/0128899 | A1 * | 6/2007 | Mayer | G06F 9/4406<br>439/152 |
| 2008/0177994 | A1 * | 7/2008 | Mayer | G06F 16/00<br>709/224 |
| 2009/0108057 | A1 * | 4/2009 | Mu | H04M 1/72445<br>235/375 |
| 2012/0036442 | A1 * | 2/2012 | Dare | G06F 8/60<br>715/736 |
| 2012/0036552 | A1 * | 2/2012 | Dare | H04L 41/0803<br>726/1 |
| 2013/0043302 | A1 * | 2/2013 | Powlen | G06Q 50/01<br>235/494 |
| 2013/0215465 | A1 * | 8/2013 | Mutsuno | G06F 3/1229<br>358/1.15 |
| 2013/0246135 | A1 * | 9/2013 | Wang | G06F 17/00<br>701/2 |
| 2018/0130042 | A1 * | 5/2018 | McLaughlin | G06Q 20/209 |
| 2021/0027127 | A1 * | 1/2021 | Sakahashi | G06K 19/06056 |

* cited by examiner

FIG.6A

| Date of issuance | FUNCTION | DEVICE | CODE | Reduced URL path | |
|---|---|---|---|---|---|
| 2019/04/30 23:59:59 | ERR | MFP3000 | 1000 | xYz01 | 601 |
| | | | | | |
| | | | | | |

FIG.6B

| Date of issuance | FUNCTION | DEVICE | CODE | Reduced URL path | |
|---|---|---|---|---|---|
| 2019/04/30 23:59:59 | ERR | MFP3000 | 1000 | xYz01 | 601 |
| 2019/05/01 00:00:01 | ERR | MFP1000 | 1100 | aBcDe | 602 |
| | | | | | |

FIG.9A

{
"FUNCTION" :" ERR" ,
"DEVICE" :" MFP3000",
"CODE" :" 1000"
}

FIG.9B

{
"FUNCTION" :" INK" ,
"DEVICE" :" MFP3000",
"CODE" :" Cyan_Low"
}

| FUNCTION | URL rule |
|---|---|
| ERR | https://manual.com/[FUNCTION]/[DEVICE]/[CODE].html |
| INK | https://onlineshop.com/[DEVICE]/ink.html |
| | |

FIG.12

ELECTRONIC DEVICE MOUNTING DISPLAY, CONTROL METHOD THEREOF AND INFORMATION PROCESSING SYSTEM

BACKGROUND OF THE INVENTION

Field of the Invention

The technique of the present disclosure relates to a technique to display an access code for accessing an information resource on a network on a display on an electronic device.

Description of the Related Art

Conventionally, in a case where an error, such as paper running out, occurs in an electronic device, such as a printer, there is a method of displaying a recovery method from the error on a display on the electronic device. Japanese Patent Laid-Open No. 2009-140204 has disclosed the following technique. First, in a case where an error is detected in an image display device, a QR code (registered trademark) indicating information on the error and a URL (Uniform Resource Locator) for connecting to a Web site is displayed. Then, a user captures the QR code with a mobile terminal to acquire the URL and connects to a product support site on the mobile terminal.

SUMMARY OF THE INVENTION

In general, the size of a display mounted on an electronic device, such as a printer, is small, and therefore, the representation ability thereof is limited in many cases. Then, the above-described QR code has such a feature that the larger the amount of information to be embedded within the code, the larger the size thereof becomes. In this regard, with the technique of Japanese Patent Laid-Open No. 2009-140204 described above, the image display device itself creates a QR code in a case where an error occurs. Similarly, in a case where the device itself, such as a printer, creates a QR code, on a condition that an attempt is made to include a larger amount of information, such as details of error information and the model name, the data amount increases and the size of the QR code becomes too large. As a result of that, there is such a problem in a case where the display mounted on a printer or the like is small, it is no longer possible to display the QR code indicating a URL for accessing a predetermined Web site.

The electronic device according to the present disclosure is a device capable of accessing a first external device via a network and having a display, and including: an acquisition unit configured to acquire an access code indicating first resource specification information for redirect; and a control unit configured to display the access code acquired by the acquisition unit on the display, and the first resource specification information has a data amount corresponding to an access code of a size that can be displayed on the display and the first external device is a device that provides second resource specification information indicating a redirect destination in response to an access based on the first resource specification information.

Further features of the present disclosure will become apparent from the following description of exemplary embodiments with reference to the attached drawings.

BRIEF DESCRIPTION OF THE DRAWINGS

FIG. 6A and FIG. 6B are each a diagram schematically showing a reduced URL management database;

FIG. 9A and FIG. 9B are each a diagram showing an example of an issuance request for a reduced URL;

FIG. 12 is a diagram showing an example of a URL rule table;

DESCRIPTION OF THE EMBODIMENTS

Figure 1:
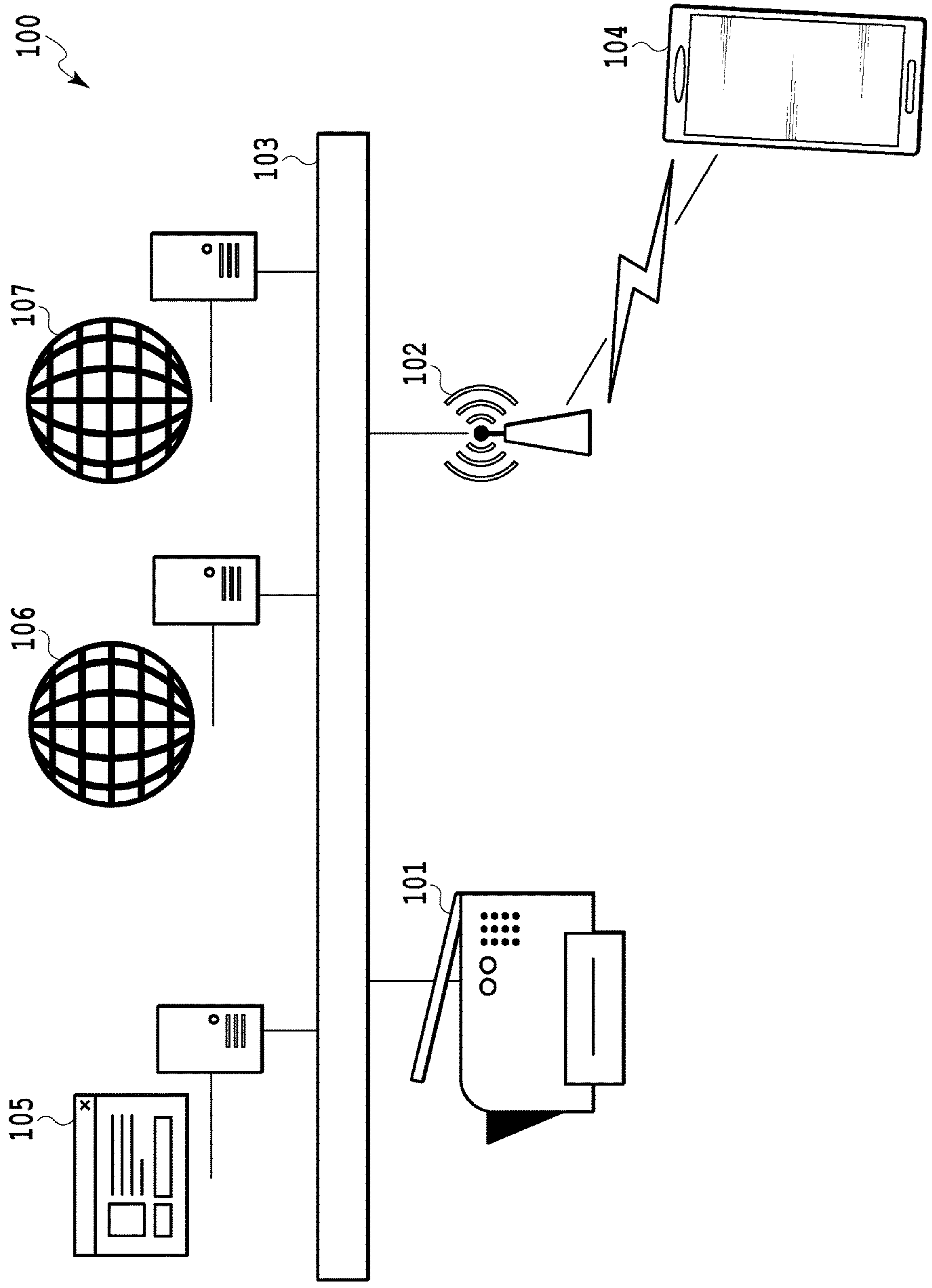
FIG. 1 is a diagram showing a configuration example of an information processing system.

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

The configuration of an information processing system according to the present embodiment is explained with reference to FIG. 1. An information processing system 100 includes an MFP (Multi Function Printer) 101, a wireless LAN router 102, an internet 103, a mobile terminal 104, an information provision server 105, and Web servers 106 and 107. The MFP 101 and the wireless LAN router 102 are connected to the internet 103 and the information provision server 105 and the Web servers 106 and 107 are also connected to the internet 103 similarly. The mobile terminal 104, such as a smartphone and a tablet, is connected with the wireless LAN router 102 wirelessly and capable of communicating with the internet 103. The mobile terminal 104 may be connected to the internet via a mobile communication network.

Figure 2:
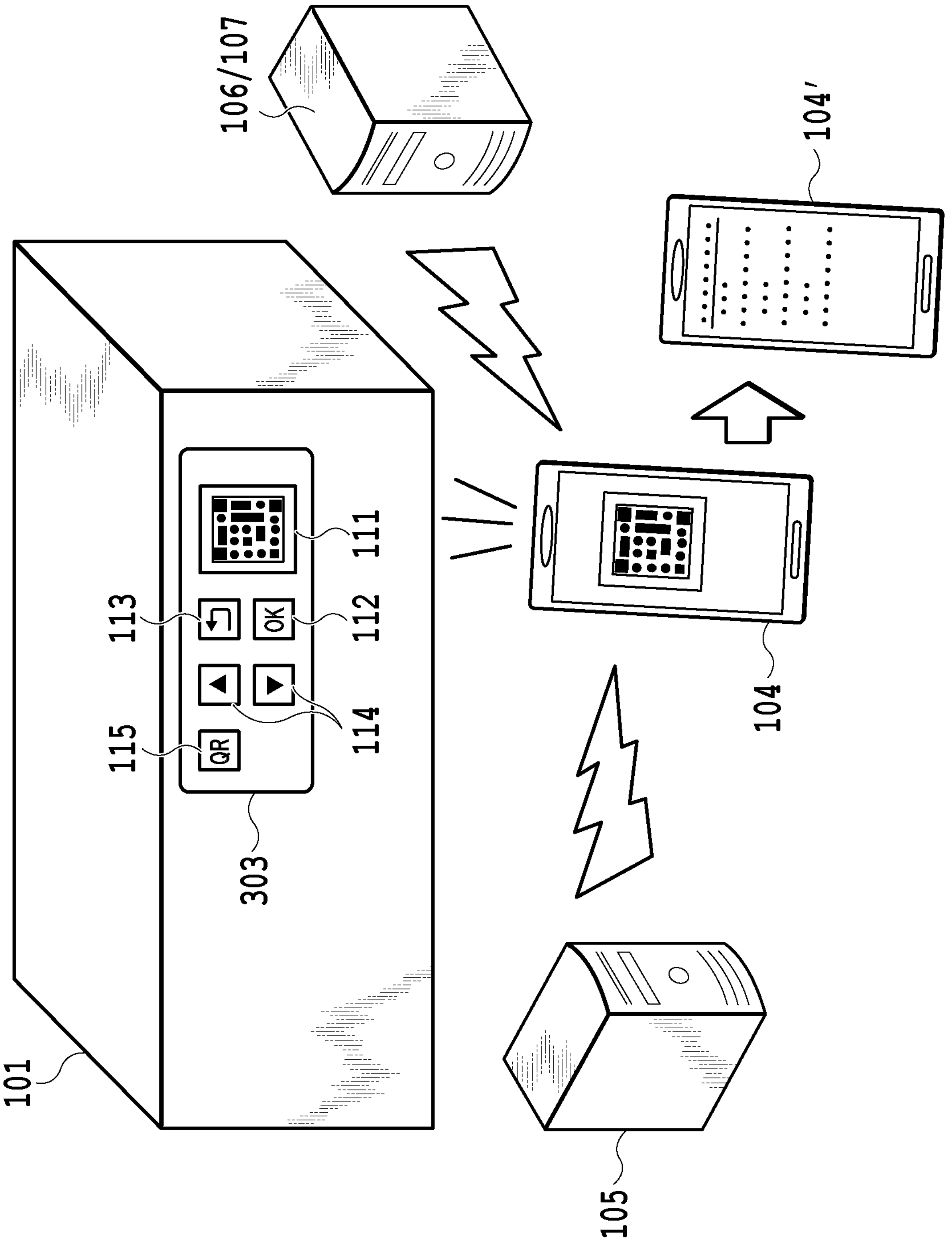
FIG. 2 is a diagram explaining an outline of processing implemented in the information processing system of the present embodiment.

FIG. 2 is a diagram explaining the outline of processing implemented in the information processing system 100 of the present embodiment. As shown in FIG. 2, the MFP 101 has an operation panel 303. The operation panel 303 is a reception unit (input unit) configured to receive an input of a setting value from a user or instructions to perform processing and provided on the casing outer surface of the MFP 101. The operation panel 303 comprises a display 111, an OK button 112, a back button 113, up/down buttons 114, and a QR code button 115. The OK button 112, the back button 113, the up/down buttons 114, and the QR code button 115 are so-called hardware keys. The display 111 is, for example, a liquid crystal display, or an organic EL display, or the like. As shown in FIG. 2, the display 111 in the present embodiment is smaller than the display screen of the mobile terminal 104. Because of this, the amount of information that the display 111 can display is small compared to that of the mobile terminal 104. The OK button 112, the back button 113, and the up/down buttons 114 are buttons that are used at the time of selecting or setting a function. The QR code button 115 is used for receiving instructions to generate a QR code from a user. In the present embodiment, the QR code is used, but this is not limited. A code (for example, another kind of two-dimensional code, such as VeriCode, or a one-dimensional code, such as a barcode) may also be used by which it is possible to read access information embedded therein by capturing the code with the mobile terminal 104. In the present specification, those codes are collectively called "access code". In a case where the QR code button 115 is pressed down, a QR code corresponding to the displayed contents of the display 111 at that point in time, or a QR code relating to the state of the MFP 101 is generated and displayed on the display 111. For example, in a case where a predetermined error has occurred in the MFP 101, on the display 111 of the MFP 101, a message to the effect that an error has occurred is displayed. Then, in a case where the QR code button 115 is pressed down, a QR code necessary for the mobile terminal to access a Web page of a solution method of this error is generated. Here, the information amount and the size of the QR code are reviewed. A plurality of versions (kinds) exists for the QR code and the cell configuration is determined for each version. The cell configuration means the number of cells in the code and as the version is upgraded, the cells increase in number by four each time both vertically and horizontally, such as that version 1 has 21×21 cells and version 2 has 25×25 cells. For each version of the QR code, the maximum number of input characters corresponding to the data amount is determined and as the data amount increases, more cells configuring the QR code are necessary. That is, as the data amount increases, the size of the QR code increases. Consequently, in the present embodiment, the MFP 101 acquires the URL whose data amount corresponds to that of the QR code of the size that can be displayed on the display 111 comprised in the MFP 101 from the information provision server 105 and creates a QR code by using the URL.

In FIG. 2, the way the QR code displayed on the display 111 of the operation panel 303 of the MFP 101 is read by the mobile terminal 104 is shown. In this example, the QR code indicates a so-called reduced URL. Here, the URL (Uniform Resource Locator) indicates the location of the information resource, such as document and image, existing on the internet 103 and can be said as "resource specification information" instead. Then, the reduced URL refers to a URL that is an actual URL represented by a smaller number of characters. The Web browser of the mobile terminal 104, first, accesses the reduced URL extracted from the read QR code and acquires a redirect destination URL (actual URL corresponding to a predetermined address of Web servers 106/107) from the information provision server 105. Then, the Web browser accesses the acquired redirect destination URL and acquires and displays page data on, such as an error solution page and an on-line shopping page. In FIG. 2, a mobile terminal 104' shows a state where predetermined page data acquired from the Web servers 106/107 is displayed on its screen.

The system configuration shown in FIG. 1 and FIG. 2 described above is an example and for example, the MFP 101 may be an SFP (Single Function Printer). Further, the print function is not indispensable and any electronic device comprising a display and capable of accessing an external device via a network may be accepted.

<Hardware Configuration of Each Device>

Figure 3:
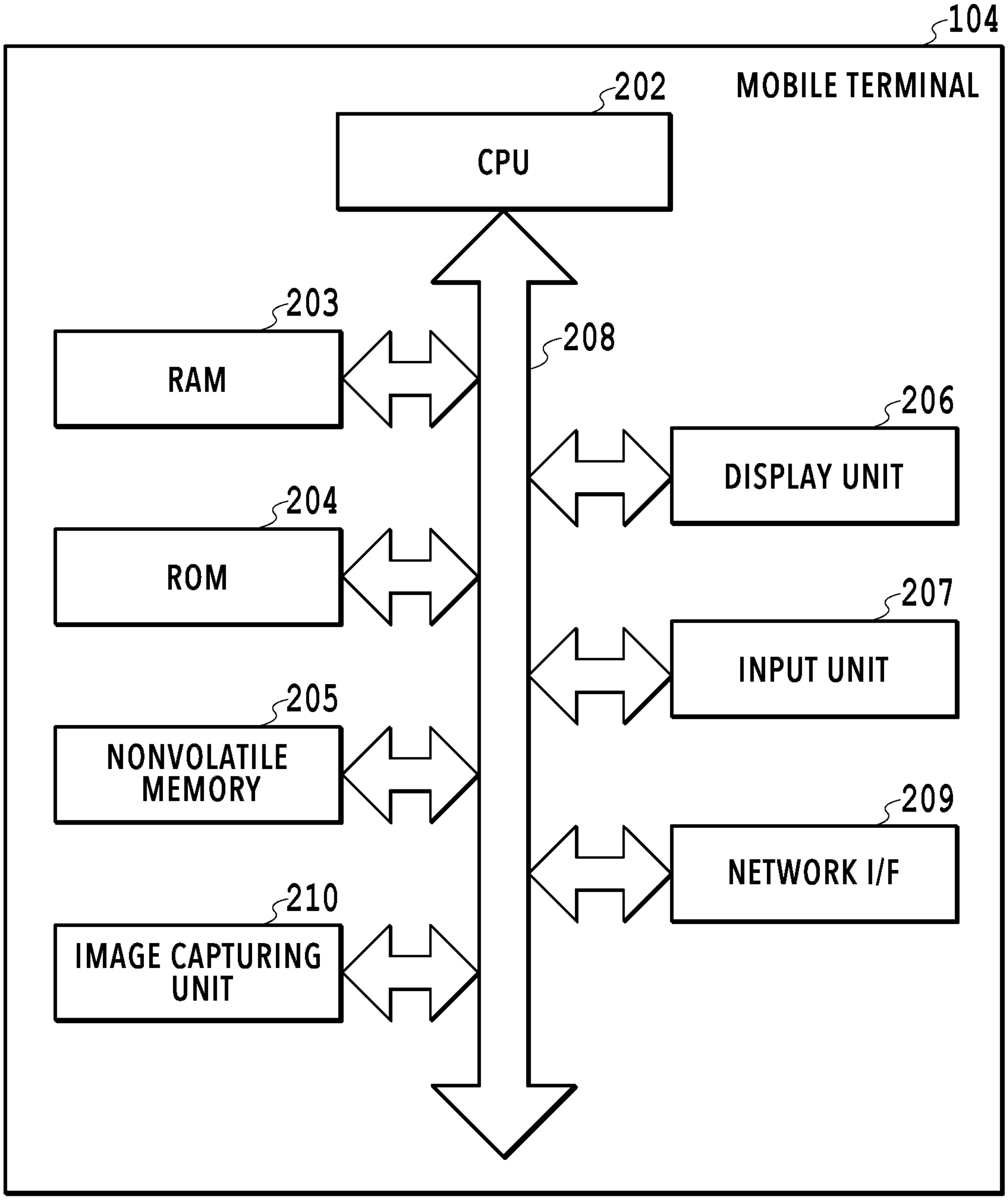
FIG. 3 is a block diagram showing a hardware configuration of a mobile terminal.

First, the hardware configuration of the mobile terminal 104 is explained with reference to the block diagram in FIG. 3. A CPU 202 is a device that centralizedly controls the mobile terminal 104 and performs various kinds of calculation processing in accordance with software stored in a RAM 203, a ROM 204, or a nonvolatile memory 205. The RAM 203 is used as a temporary storage area at the time of the CPU 202 performing various kinds of calculation processing. The nonvolatile memory 205 stores an operating system (OS), application software, and the like. A display unit 206 includes a liquid crystal display and a graphics controller and implements a GUI using a shot-cut menu, a launcher icon, and the like. An input unit 207 is configured as a touch panel integrated with the display unit 206 and receives various instructions from a user. The input unit 207 may be another device, for example, such as a mouse and a keyboard. A system bus 208 performs transmission and reception of data between each of the above-described units. Further, a network I/F 209 performs transmission and reception of data with an external device connected to the internet 103 by using a wireless LAN or a wired LAN. As the wireless communication method, it is possible to use the communication method in conformity with, for example, the IEEE 802.11 series (IEEE 802.11a, IEEE 802.11n (Wi-Fi 4), IEEE 802.11ac (Wi-Fi 5), IEEE 802.11ax (Wi-Fi 6) and the like). Further, it is also possible to connect to a mobile communication network. An image capturing unit 210 generates a digital image by performing image capturing using an image sensor, such as a CCD (Charge Coupled Device).

Figure 4:
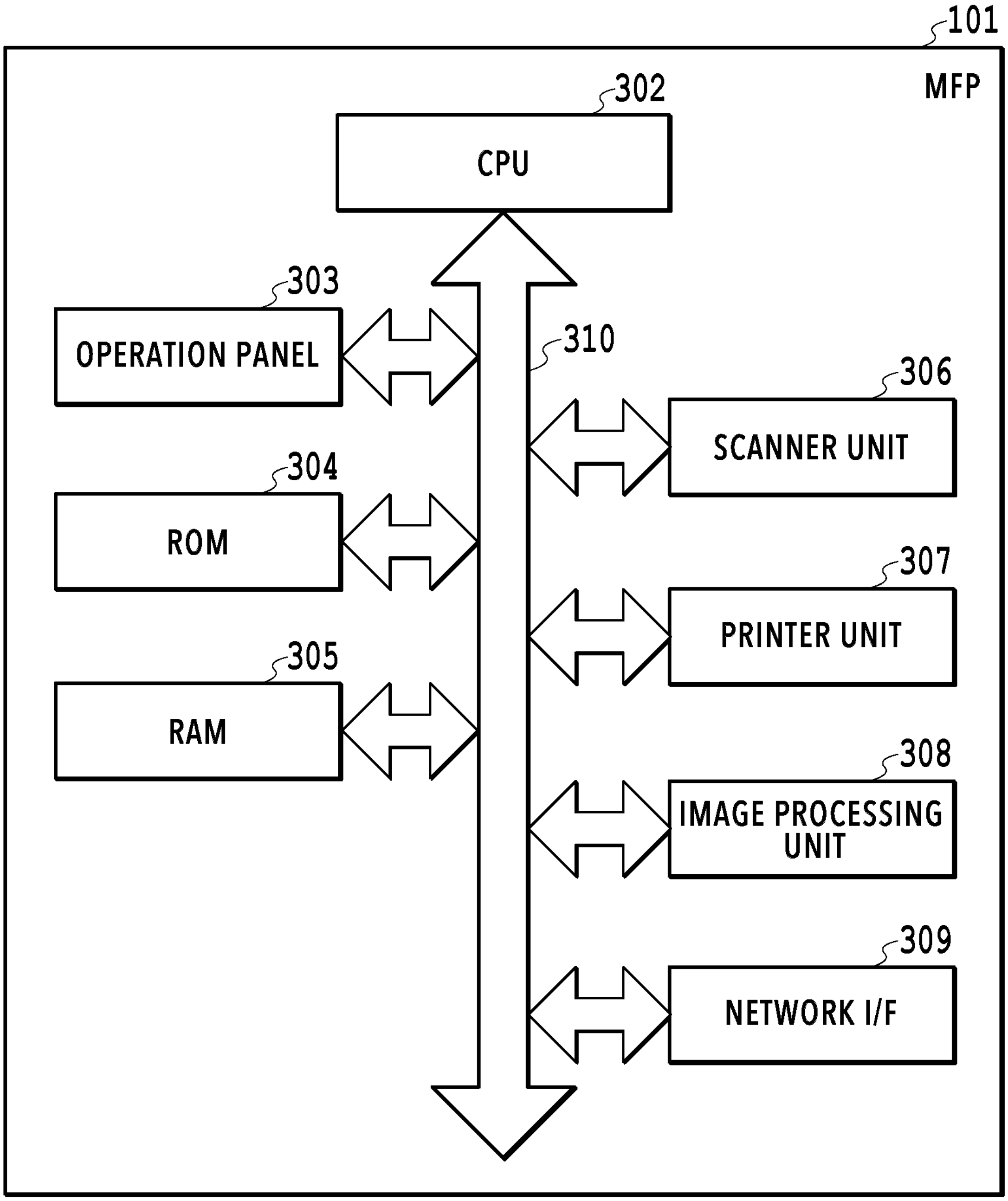
FIG. 4 is a block diagram showing a hardware configuration of an MFP.

Next, the hardware configuration of the MFP 101 is explained with reference to the block diagram in FIG. 4. A CPU 302 centralizedly controls the MFP 101 by loading programs stored in a ROM 304 onto a RAM 305 and executing the programs in accordance with a user operation for the operation panel 303. The ROM 304 stores control programs of the MFP 101, and the like. The RAM 305 is used as a working memory of the CPU 302 and at the same time, also used as a storage area of a spooler of a print job. The configuration of the operation panel 303 is as described previously. A scanner unit 306 generates image data by reading a document set on a document table or an ADF (Auto Document Feeder) with an optical sensor. A printer unit 307 forms an image on a printing medium, such as paper, by a predetermined printing method, such as the ink jet method or the electrophotographic method, and outputs the printing medium. An image processing unit 308 performs image processing necessary for performing printing processing in the printer unit 307 for the image data generated by the scanner unit 306 or the image data input from an external device. A network I/F 309 performs transmission and reception of data with an external device connected to the internet 103 by using a wireless LAN or a wired LAN. As the wireless communication method, it is possible to use, for example, the communication method in conformity with IEEE 802.11 series (IEEE 802.11a, IEEE 802.11n (Wi-Fi 4), IEEE 802.11ac (Wi-Fi 5), IEEE 802.11ax (Wi-Fi 6) and the like).

Figure 5:
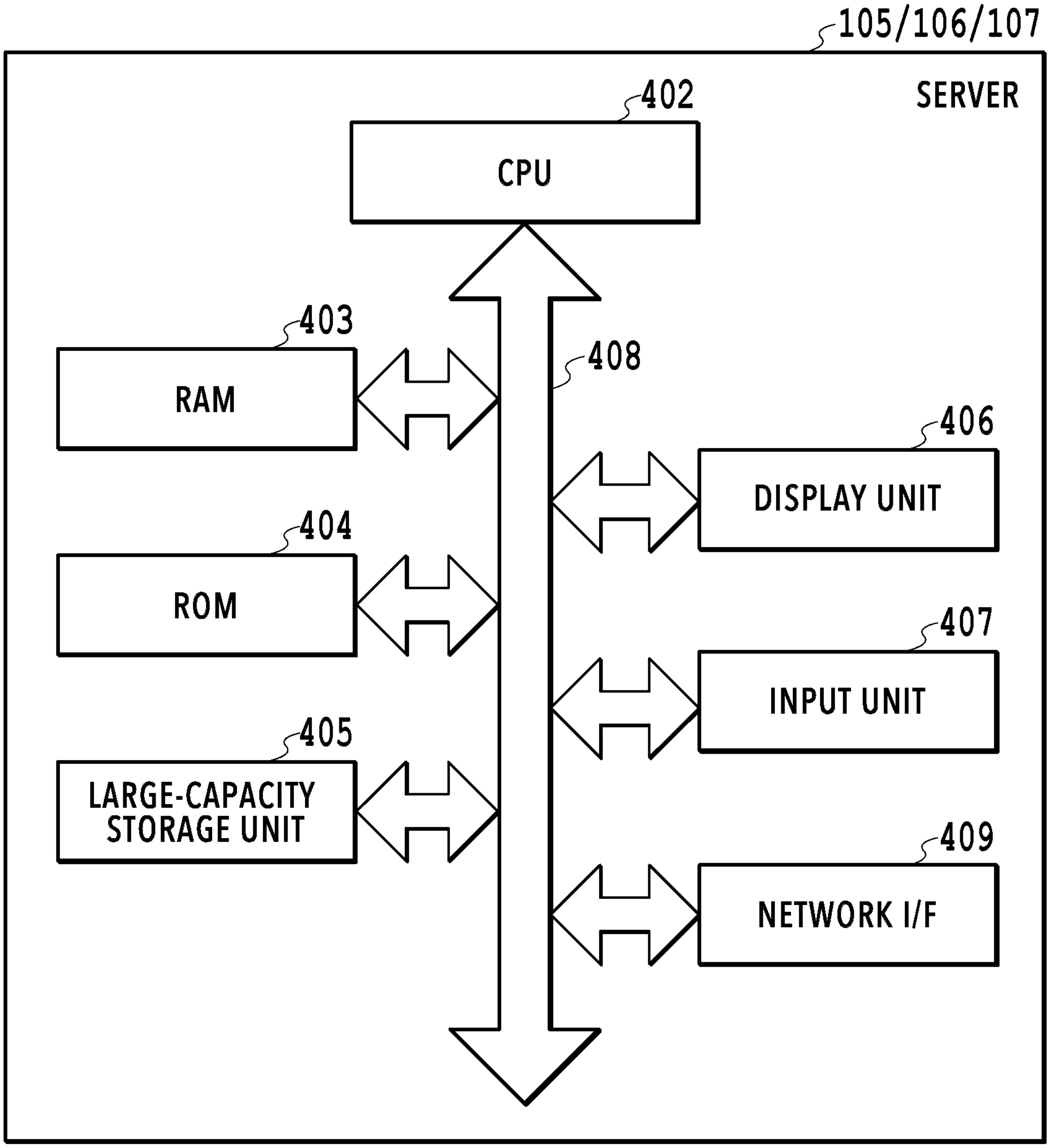
FIG. 5 is a block diagram showing a hardware configuration of various servers.

Next, the hardware configuration of the information provision server 105 and the Web servers 106/107 is explained by using the block diagram in FIG. 5. Each of the servers 105 to 107, each being the information processing apparatus, has a CPU 402, a RAM 403, a ROM 404, a display unit 406, an input unit 407, a system bus 408, and a network I/F 409. Each of these units corresponds to each of the units 202 to 209 (except for the nonvolatile memory 205) of the mobile terminal 104 shown in FIG. 3. Each of the servers 105 to 107 has a large-capacity storage unit 405, which is represented by an HDD or an SSD, in place of the nonvolatile memory 205.

Contents stored in the large-capacity storage unit 405 are different depending on the service provided by the server. In a case of the information provision server 105, a reduced URL creation program, a reduced URL management database, a redirect program and the like are stored. The reduced URL creation program is a program for creating a reduced URL in response to a request. The reduced URL management database is a database that manages a created reduced URL. The redirect program is a program that returns a redirect destination URL indicating the actual access destination in a case where an access is made with a reduced URL. In a case of the Web servers 106/107, a Web service program for returning an HTML page in response to a request from the mobile terminal 104 or the like is stored. FIG. 6A is a diagram schematically showing the reduced URL management database stored in the information provision server 105. In a case where an issuance request for a reduced URL is received from the MFP 101, parameters, such as the issuer device name, included in the issuance request are acquired by the reduced URL creation program and a reduced URL corresponding to the parameters is issued. Then, information on the path, the parameters, and the date of issuance of the issued reduced URL is saved in the reduced URL management database. It may also be possible to delete the above-described data saved in the reduced URL management database after a predetermined time (for example, 24 hours) elapses from the date of issuance.

<Display Processing Sequence of Error Solution Page>

Figure 7:
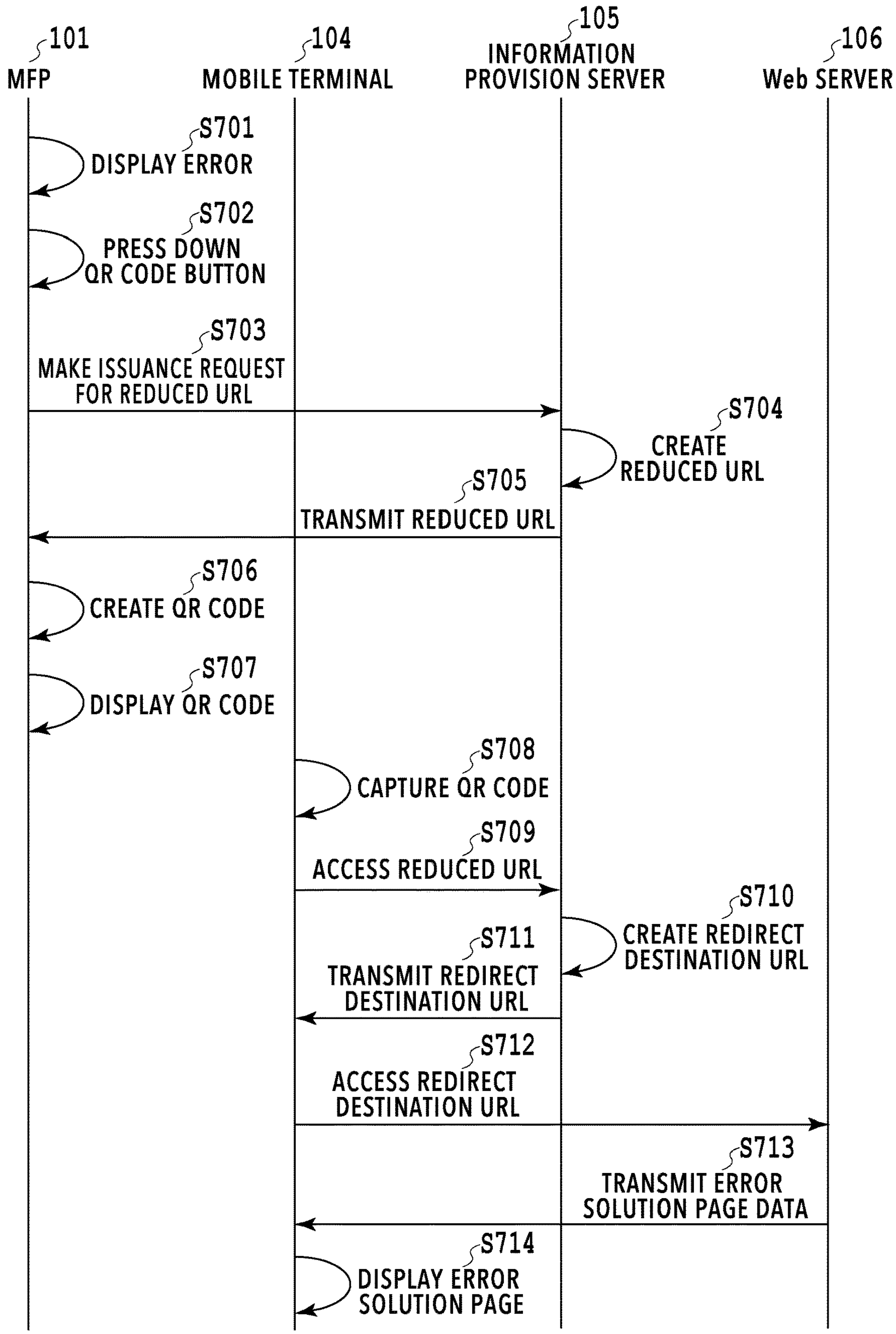
FIG. 7 is a sequence diagram showing a flow of processing between each device until an error solution page is displayed according to a first embodiment.

Next, a processing sequence according to the present embodiment is explained, which displays a Web page (error solution page) explaining a solution method in accordance with error contents on the mobile terminal 104 in a case where an error occurs in the MFP 101. FIG. 7 is a sequence diagram showing a flow of processing between each device until the error solution page is displayed according to the present embodiment. In the following, explanation is given along the sequence diagram in FIG. 7.

Figure 8:
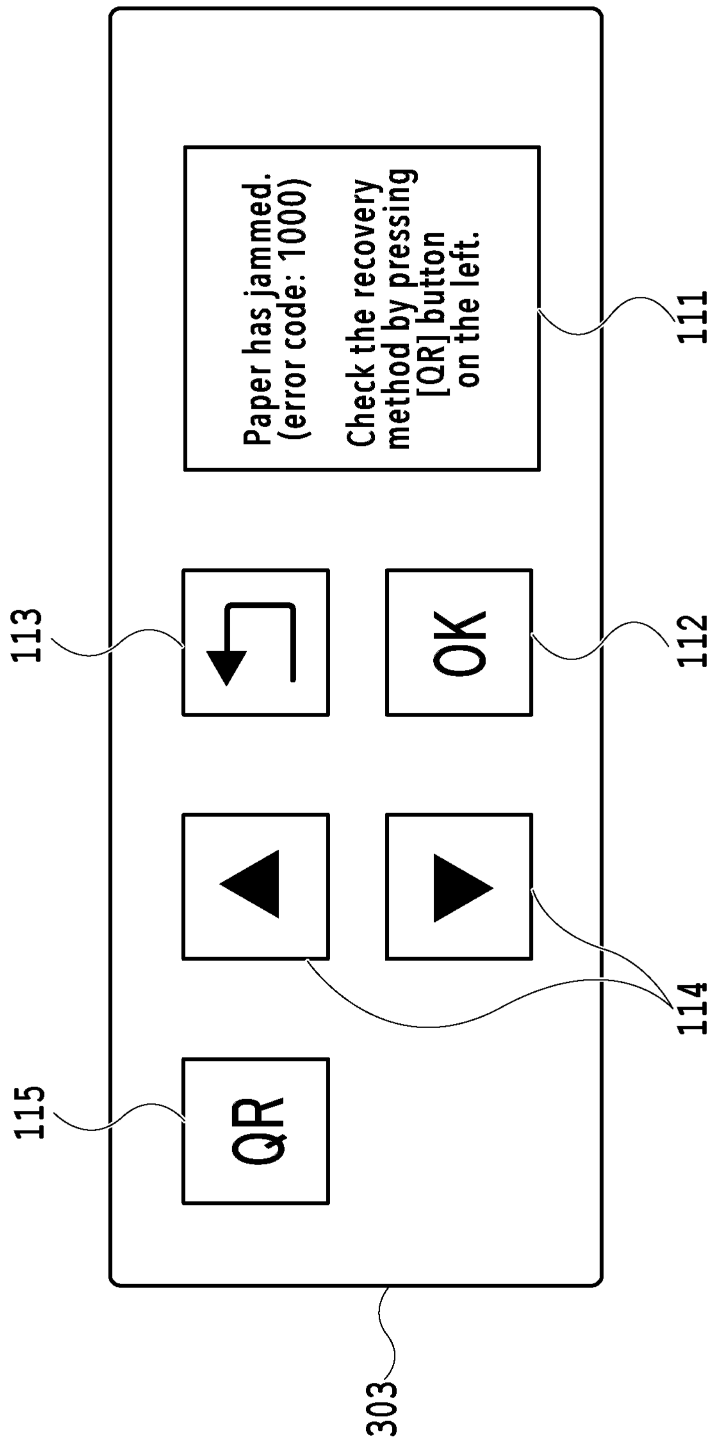
FIG. 8 is a diagram showing an example of an error message that is displayed on a display of an operation panel.

It is assumed that, for example, a paper jam error has occurred in the printer unit 307 during printing in the MFP 101. In this case, on the display 111 of the operation panel 303 of the MFP 101, a message to the effect that a paper jam error has occurred as shown in FIG. 8 is displayed (S701). As shown in FIG. 8, this message also includes a description to tell a user to press down the QR code button 115 in a case of checking the details of an error recovery method. In a case where a user presses down the QR code button 115 in accordance with the message (S702), the MFP 101 transmits an issuance request for a reduced URL to the information provision server 105 (S703). In the present embodiment, by using the POST method of the HTTP communication, parameters are set in the json (JavaScript (registered trademark) Object Notation) format in the request body. FIG. 9A shows an example of an issuance request for a reduced URL according to the present embodiment. Here, in the issuance request for a reduced URL, ["FUNCTION": "ERR"] indicating the occurrence of an error, ["DEVICE": "MFP3000"] indicating the model name of the MFP 101, and ["CODE": "1000"] indicating the code specifying the error contents are included. However, the parameters included in the issuance request for a reduced URL are not limited to those and for example, more parameters may be included, such as a language of destination. In the setting of these parameters, another format, such as the XML (Extensible Markup Language) format, may be used.

Figure 10:
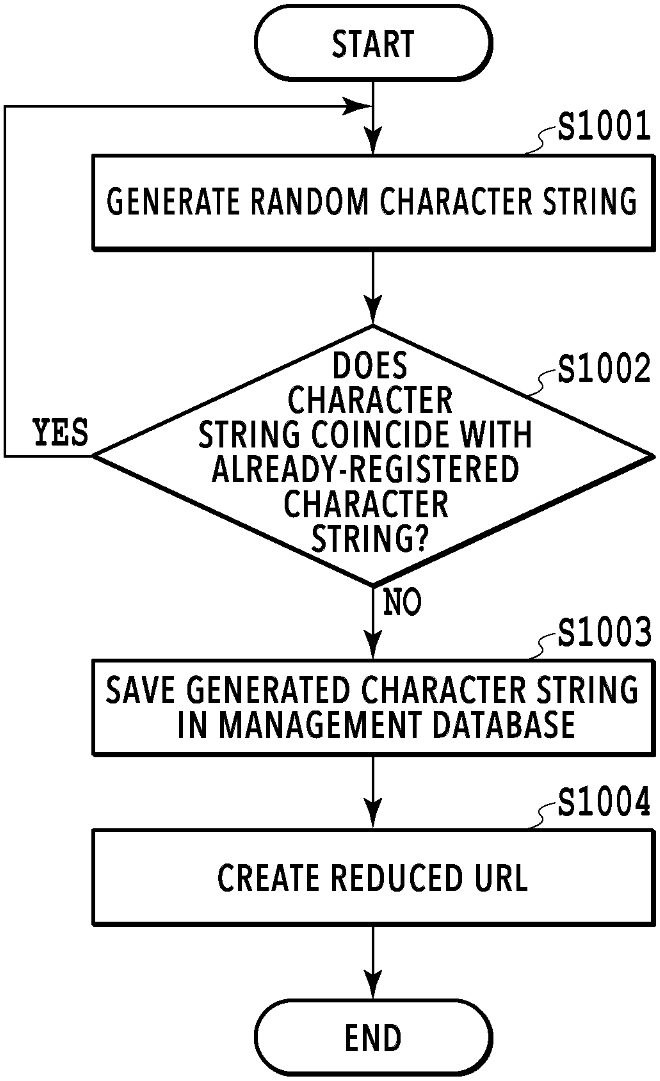
FIG. 10 is a flowchart showing a creation method of a reduced URL.

In the information provision server 105 having received the issuance request for a reduced URL, the reduced URL creation program creates a reduced URL based on the parameters within the request (S704). Here, with reference to the flowchart shown in FIG. 10, the creation method of a reduced URL is explained. Each step shown in FIG. 10 is implemented by the CPU 402 of the information provision server 105 loading the program stored in the ROM 404 or the large-capacity storage unit 405 onto the RAM 403 and executing the program.

First, at S1001, for the received request, a random character string is generated. At S1002 that follows, whether the random character string generated at S1001 coincides with a character string already registered in the "reduced URL path" of the above-described reduced URL management database is determined (S1002). In a case where results of the determination indicate that the random character string generated at S1001 coincides with an already-registered character string, the processing returns to S1001 and a random character string is generated again. On the other hand, in a case where the random character string does not coincide with any already-registered character string, the random character string generated at S1001 is settled as a new reduced URL path and the processing advances to S1003. Here, it is assumed that a character string of "aBcDe" is generated at S1001 and in the "reduced URL path" of the reduced URL management database, a character string of "xYz01" is registered (in the state in FIG. 6A described previously). In this case, the character string "aBcDe" generated at S1001 does not coincide with the character string already registered in the "reduced URL path", and therefore, it is settled that the character string "aBcDe" is used as a reduced URL path. Next, at S1003, the character string generated at S1001 is newly saved/registered in the "reduced URL path" of the reduced URL management database. At this time, the current date, each parameter specified in the above-described issuance request are also saved/registered. FIG. 6B shows a state where a new record 602 is added to a state where a record 601 shown in FIG. 6A exists.

At 51004 that follows, a reduced URL including a relatively small number of characters is created, which combines the character string generated at S1001 and registered in the "reduced URL path" of the reduced URL management database and the domain of the information provision server 105. In the above described example, "https://example.com/aBcDe" that combines the character string "aBcDe" and the domain "https://example.com/" is created as a reduced URL. Explanation is returned to the sequence diagram in FIG. 7.

Figure 11:
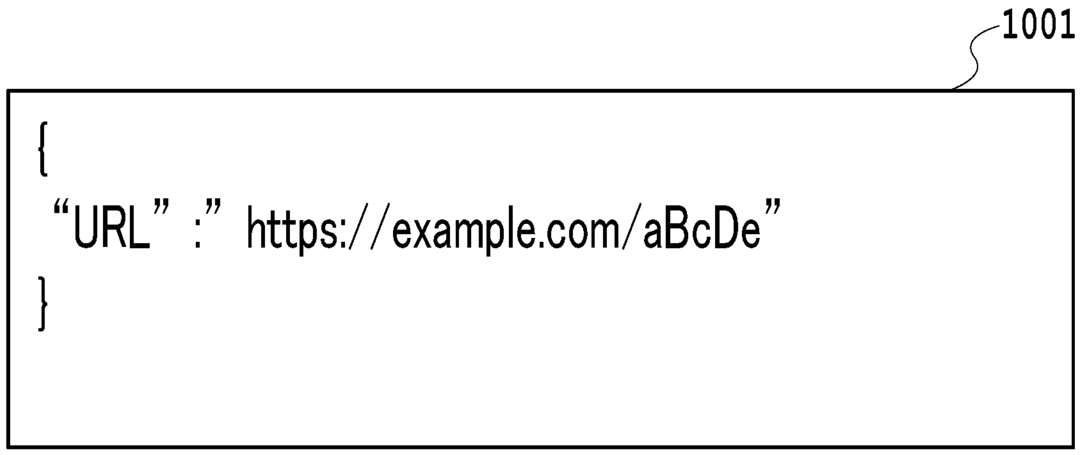
FIG. 11 is a diagram showing an example of a response to an issuance request for a reduced URL.

The information provision server 105 having created a reduced URL based on the request from the MFP 101 as described above returns the created reduced URL to the MFP 101 as a response to the request. FIG. 11 shows an example of the response at this time and in the response body, the reduced URL in the same j son format as that of the request is described.

In the MFP 101 having received the reduced URL, the QR code generation program converts the received reduced URL into a QR code (S706), The QR code thus created is displayed on the display 111 (S707).

Next, a user activates a QR code read program of the mobile terminal 104 and captures the QR code displayed on the operation panel 303 of the MFP 101 by using the image capturing unit 210 (camera function) (S708). From the image thus captured, a reduced URL is extracted. Then, the mobile terminal 104 accesses the extracted reduced URL (information provision server 105) (S709). It may also be possible for the QR code read program to access the reduced URL following extraction, or it may also be possible to access the reduced URL by activating a Web browser installed separately.

In response to the access to the reduced URL, the information provision server 105 creates a redirect destination URL corresponding to the reduced URL (S710). Specifically, first, the information provision server 105 extracts a path within the reduced URL. Then, the information provision server 105 searches for a character string that coincides with the extracted character string in the character strings registered in the "reduced URL path" of the reduced URL management database. Here, in a case where the character string "aBcDe" described above is extracted and a search is made for the reduced URL management database shown in FIG. 6B described previously, the character string "aBcDe" coincides with the record 602. In this case, "ERR", "MFP1000", and "1100", which are the values of "FUNCTION", "DEVICE", and "CODE" respectively of the record 602 are read. The information provision server 105 creates a URL (hereinafter, called "redirect destination URL") indicating the address of a Web page within the Web server 106 based on the parameter values read as described above and the URL rule table shown in FIG. 12. Specifically, by the procedure as follows, a redirect destination URL is created. First, by referring to the row in which the value of "FUNCTION" in the URL rule table in FIG. 12 is "ERR" and the URL rule to be applied is read. In the example described above, "https://manual.com/[FUNCTION]/[DEVICE]/[CODE].html" is read. Further, each character string bracketed by "[ ]" is replaced with the read parameter value and a URL indicating the address of the error solution page present within the Web server 106 is created. In the example described above, "https://manual.com/ERR/MFP1000/1100.html" is created. The information provision server 105 returns the URL thus created to the mobile terminal 104 as a redirect destination URL (S711).

Next, the mobile terminal 104 accesses the redirect destination URL received from the information provision server 105 (S712). In response to this access, the Web server 106 returns data on the error solution page of the paper jam corresponding to the redirect destination URL to the mobile terminal 104 (S713). Then, the Web browser of the mobile terminal 104 displays the error solution page on the display unit 206 (S714).

The above is the contents of the error solution page display processing sequence according to the present embodiment. In the present embodiment, the QR code is created in the MFP 101 based on the reduced URL received from the information provision server 105, but it may also be possible to design the configuration so that the creation of the QR code is also performed on the side of the information provision server 105. In this case, the MFP 105 displays the QR code by acquiring the image data on the QR code generated by the information provision server 105. Consequently, even in a case where the MFP 101 does not store the QR code generation program, it is made possible to display the QR code indicating a reduced URL.

Further, in the present embodiment, for the access to the information provision server 105, the POST method of HTTP is used, but the method is not limited to this. For example, it may also be possible to access the information provision server 105 by a URL, such as "https://example.com?FUNCTION=ERR&DEVICE=MFP3000&CODE=1000", by using the GET method and return a reduced URL in the redirect status in this response header. Further, it may also be possible for the information provision server 105 to have also the function of the redirect server. In a case where the configuration such as this is adopted, a reduced URL is returned only in a case where UserAgent within the HTTP header is "MFP_CODE_REQUEST" meaning an issuance request for a reduced URL. Then, in a case where UserAgent is a character string other than "MFP_CODE_REQUEST", a URL indicating the address of the error solution page is returned.

Further, it may also be possible to determine whether to make an issuance request for a reduced URL based on the length (data amount) of an actual URL by creating the URL (here, URL of the error solution page) in the MFP 101. From the information on the display 111 mounted on the operation panel 303 of the MFP 101, the size of a QR code that can be displayed is known in advance. Consequently, a threshold value of the data amount in accordance with the QR code size is determined in advance and in a case where the length (data amount) of the created URL of the error solution page exceeds the threshold value corresponding to a predetermined length, an issuance request for a reduced URL is made and a reduced URL is acquired from the information provision server 105. On the other hand, it may also be possible to design the configuration so that in a case where the length (data amount) of the created URL of the error solution page does not exceed the threshold value, a QR code indicating the URL is created immediately in the MFP 101. It may also be possible to perform control to switch between creating a QR code directly and creating a QR code via a reduced URL as described above.

Further, the information provision server 105 and the Web server 106 are configured as separate servers, but it may also be possible for one and the same server to provide both the functions.

Modification Example

Figure 13:
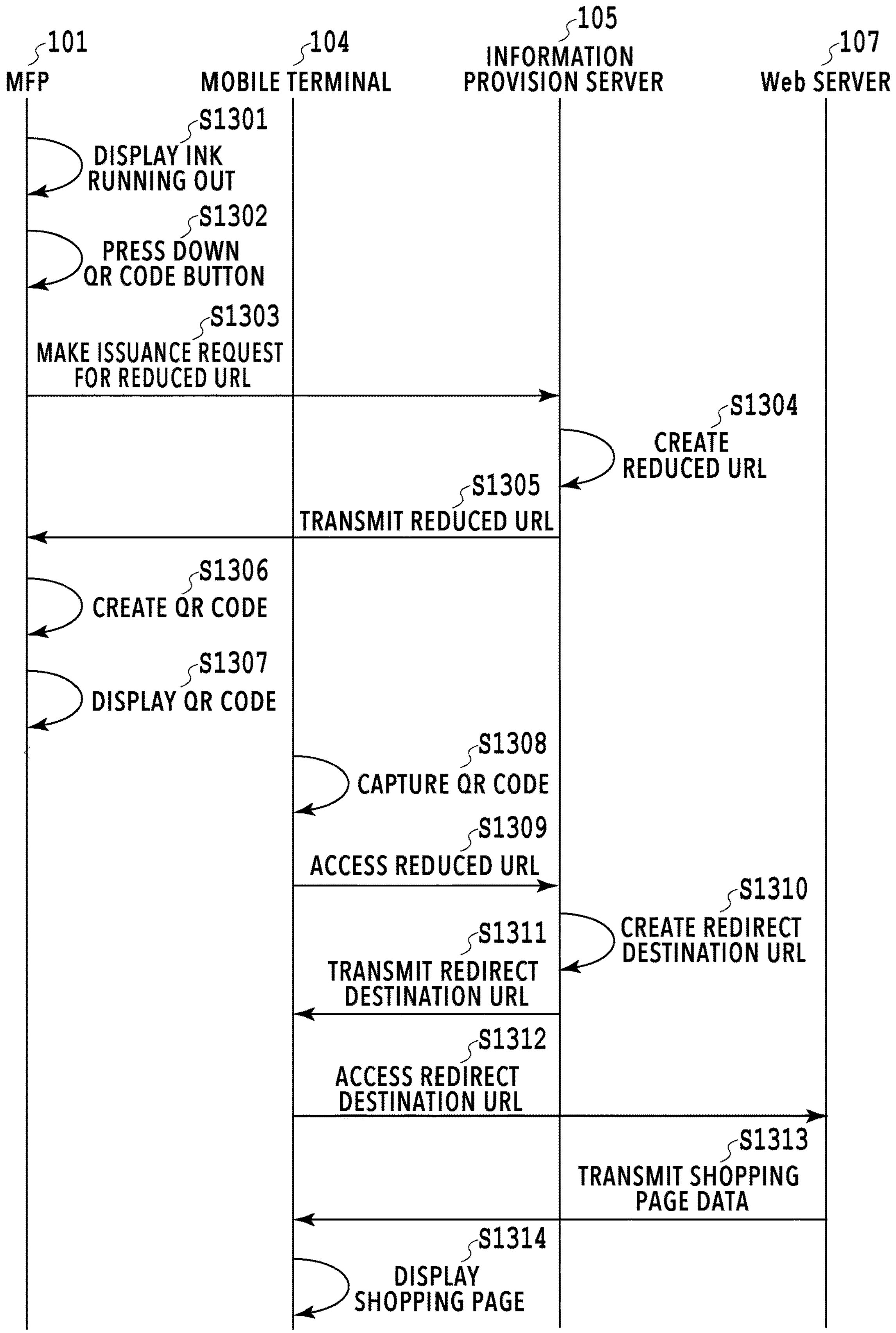
FIG. 13 is a sequence diagram showing a flow of processing between each device until a shopping page is displayed according to a modification example of the first embodiment.

Next, as a modification example of the present embodiment, a processing sequence for displaying on the mobile terminal 104 an on-line shopping Web page for ordering a consumable part in a case where a consumable part, such as a color material, in the MFP 101 has run out is explained. FIG. 13 is a sequence diagram showing a flow of processing between each device until an on-line shopping Web page (hereinafter, called "shopping page") is displayed. In the following, explanation is given along the sequence diagram in FIG. 13, but explanation of the contents in common to those of the sequence diagram in FIG. 7 is omitted and different points are explained mainly.

In a case where, for example, an ink running out occurs in the printer unit 307 during printing processing in the MFP 101, on the operation panel 303 of the MFP 101, a message to the effect that an ink running out has occurred is displayed (S1301). As at S702 described previously, in a case where a user presses down the QR code display button 115 (S1302), an issuance request for a reduced URL is transmitted to the information provision server 105 (S1303). FIG. 9B shows the contents of the request body in this case. In a case of FIG. 9B, information on ["FUNCTION": "INK"] indicating an item, ["DEVICE": "MFP3000"] indicating the model name of the MFP 101, and a code ["CODE": "Cyan Low"] specifying the ink color and the state thereof is included.

S1304 to S1312 that follow are basically the same as S703 to S712 described previously. However, in creating a reduced URL (S1304), the URL rule is read by referring to the row in which "FUNCTION" in the URL rule table in FIG. 12 described previously is "INK". Then, in creating a redirect destination URL (S1310), a URL corresponding to the address of an ink purchase page in the Web service of the on-line shop is created. Here, "https://onlineshop.com/MFP3000/ink.html" is created. Then, the created URL is returned as a redirect destination URL (S1311). A user accesses the redirect destination URL (Web server 107 of the on-line shop) from the mobile terminal 104 and acquires predetermined page data (S1312, S1313) and opens the shopping page (S1314).

As above, according to the present modification example, in a case where ink running out occurs, it is possible to guide a user to the on-line shop for purchasing the ink. Further, in the present modification example, only the ink purchase page is displayed, but it may also be possible to highlight the color of the ink having run out by including information on the ink status in the URL. For example, by creating a URL, such as "https://onlineshop.com/MFP3000/ink.html?STATUS=Cyan Low", it is possible to highlight that the cyan ink has run out.

Further, in this modification example, the character string combining the ink color and the ink status is set to "CODE", but it is also possible to set by using figures. For example, a method is considered in which a color is allocated to each place, such as cyan to the thousand's place, magenta to the hundreds place, yellow to the tens place, and black to ones place, and a value of "1" is attached to the color whose ink has run out and a value of "0" is attached to the color whose ink has not run out yet. In this case, on a condition that the cyan ink has run out, "1000" is set to "CODE".

As above, in the present embodiment, in the image processing apparatus, such as an MFP, which mounts a compact display, in a case where it is desired to display a QR code indicating a URL for browsing a Web page, a QR code is created by acquiring its reduced URL from the information provision server. Due to this, it is made possible to display a QR code in which a necessary information amount is embedded even on a compact display.

Second Embodiment

In the first embodiment, at the time of the off-line state where the MFP 101 is not connected to the internet, it is not possible to make an issuance request for a reduced URL to the information provision server 105, and as a result of that, it is no longer possible to display a QR code. Consequently, an aspect is explained as a second embodiment in which it is made possible to display a necessary QR code even in a case where the MFP 101 is in the off-line state. Explanation of the contents in common to those of the first embodiment, such as the basic configuration of the system, is omitted or simplified and in the following, different points are explained mainly.

<Display Processing Sequence of Error Solution Page>

Figure 14:
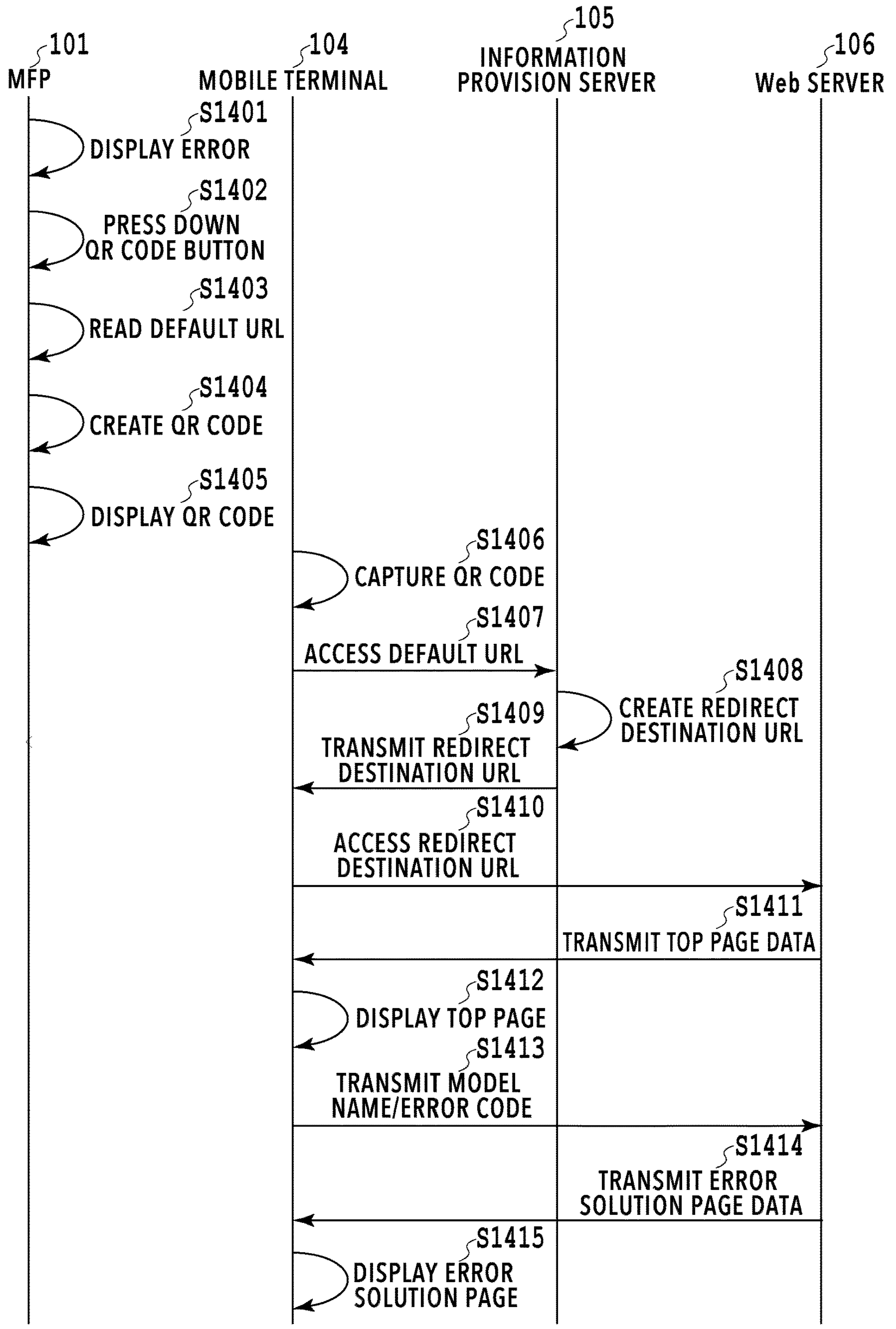
FIG. 14 is a sequence diagram showing a flow of processing between each device until an error solution page is displayed according to a second embodiment.

FIG. 14 is a sequence diagram showing a flow of processing between each device until an error solution page is displayed according to the present embodiment. In the following, explanation is given along the sequence diagram in FIG. 14.

It is assumed that a paper jam error occurs and a message indicating that is displayed (S1401), and a user presses down the QR code button 115 in accordance with the message (S1402). The MFP 101 having detected the pressing down of the QR code button 115 checks whether the state is a state where it is possible to communicate with the information provision server 105 and in a case of checking that communication is not possible, acquires a URL that is a default setting (hereinafter, called "default URL") by reading it from the ROM 304 or the like (S1403). In the present embodiment in which it is desired to ultimately display an error solution page in accordance with the error contents, the default URL is the domain (for example, "https://manual.com") of the top page of a Web manual provided by the Web server 106. Then, the MFP 101 converts the acquired default URL into a QR code (S1404) and display the QR code on the display 111 of the operation panel 303 (S1405). In a case of the state where it is possible to communicate with the information provision server 105, it is sufficient to make an issuance request for a reduced URL to the information provision server 105 as in the first embodiment.

Next, a user captures the QR code by using the camera function of the mobile terminal 104 (S1406) and accesses the obtained default URL (S1407). The information provision server 105 having been accessed with the default URL creates a redirect destination URL and returns it to the MFP 101 (S1408, S1409) and what is returned at this time is the URL of the top page of the Web manual. A user opens the top page of the Web manual with the Web browser of the mobile terminal 104 (S1412) and makes a request for an error solution page to the Web server 106 by specifying the model name of the MFP 101 and the code of the error that has occurred (S1413).

Upon receipt of the request, the Web server 106 returns data on the error solution page corresponding to the specified model name and the error code to the mobile terminal 104 (S1414). Then, a user checks the error solution page with the Web browser of the mobile terminal 104 (S1415).

The above is the contents of the display processing sequence of an error solution page in a case where the MFP 101 is in the off-line state. As described above, according to the present embodiment, in a case where the MFP 101 is in the off-line state, the MFP 101 creates/displays a QR code by using a default URL. Due to this, also at the time of the MFP 101 being off-line, it is made possible to display a QR code.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is made possible to display an access code for accessing an information resource on a network also on an electronic device having a compact display.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-137854, filed Jul. 26, 2019 which is hereby incorporated by reference wherein in its entirety.

What is claimed is:

1. An electronic device capable of accessing a first external device via a network and having a display, the electronic device comprising:

a control unit configured to display a message related to an event occurred in the electronic device on the display;

a request unit configured to send a request to the first external device based on a user operation for displaying an access code related to the message, wherein the first external device creates first resource specification information in response to the request from the electronic device so that the first resource specification information has a data amount corresponding to an access code of a size that can be displayed on the display, and wherein the first external device sends the created first resource specification information to the electronic device;

a reception unit configured to receive the first resource specification information from the first external device;

a creating unit configured to create an access code indicating the received first resource specification information; and a control unit configured to display the created access code on the display, wherein the first resource specification information is used to provide second resource specification information which is created using a parameter relating to the electronic device by the first external device and is information for accessing a Web service related to the occurred event, and wherein the data amount of the first resource specification information is reduced from a data amount of the second resource specification information.

2. The electronic device according to claim 1, wherein the electronic device creates resource specification information corresponding to the redirect destination and in a case where a data amount of the created resource specification information exceeds a data amount corresponding to an access code of a size that can be displayed on the display, makes a request for creation of the first resource specification information to the first external device.

3. The electronic device according to claim 1, further comprising:

a saving unit configured to save the first resource specification information having a data amount corresponding to an access code of a size that can be displayed on the display, wherein the acquisition unit creates, in a case where the electronic device is in an off-line state, the access code by using the first resource specification information saved in the saving unit.

4. The electronic device according to claim 1, wherein the second resource specification information is a URL of the Web service provided by a second external device that can be accessed via the network.

5. The electronic device according to claim 4, wherein the Web service is a service to provide a Web manual in accordance with contents of an error having occurred in the electronic device.

6. The electronic device according to claim 5, wherein in a URL of the Web service, information on a model name of the electronic device and an error code is included.

7. The electronic device according to claim 4, wherein the Web service is a service to provide on-line shopping for purchasing a consumable part of the electronic device.

8. The electronic device according to claim 7, wherein in a URL of the Web service, information on a model name of the electronic device and an item of a consumable part is included.

9. The electronic device according to claim 6, wherein in a URL of the Web service, information on a language of destination is further included.

10. The electronic device according to claim 8, wherein in a URL of the Web service, information on a language of destination is further included.

11. The electronic device according to claim 1, wherein the access code is a QR code (registered trademark).

12. A control method of an electronic device capable of accessing a first external device via a network and having a display, the control method comprising the steps of:

displaying a message related to an event occurred in the electronic device on the display;

sending a request to the first external device based on a user operation for displaying an access code related to the message, wherein the first external device creates first resource specification information in response to the request from the electronic device so that the first resource specification information has a data amount corresponding to an access code of a size that can be displayed on the display, and wherein the first external device sends the created first resource specification information to the electronic device;

receiving the first resource specification information from the first external device;

creating an access code indicating the received first resource specification information; and displaying the created access code on the display, wherein the first resource specification information is used to provide second resource specification information which is created using a parameter relating to the electronic device by the first external device and is information for accessing a Web service related to the occurred event, and wherein the data amount of the first resource specification information is reduced from a data amount of the second resource specification information.

13. An information processing system in which an electronic device having a display and an information processing apparatus are connected via a network, wherein the electronic device comprises:

a control unit configured to display a message related to an event occurred in the electronic device on the display;

a request unit configured to send a request to the information processing apparatus based on a user operation for displaying an access code related to the message, wherein the information processing apparatus creates first resource specification information in response to the request from the electronic device so that the first resource specification information has a data amount corresponding to an access code of a size that can be displayed on the display, and wherein the information processing apparatus sends the created first resource specification information to the electronic device;

a reception unit configured to receive the first resource specification information from the information processing apparatus;

a creating unit configured to create an access code indicating the received first resource specification information; and a control unit configured to display the created access code on the display, wherein the first resource specification information is used to provide second resource specification information which is created using a parameter relating to the electronic device by the information processing apparatus and is information for accessing a Web service related to the occurred event, and wherein the data amount of the first resource specification information is reduced from a data amount of the second resource specification information.

* * * * *